United States Patent Office 2,879,821
Patented Mar. 31, 1959

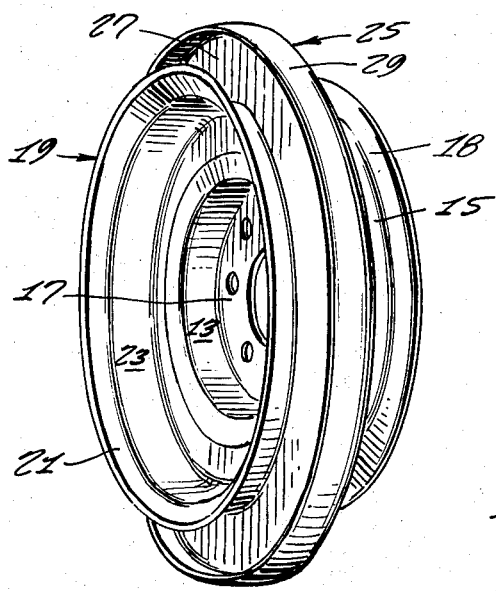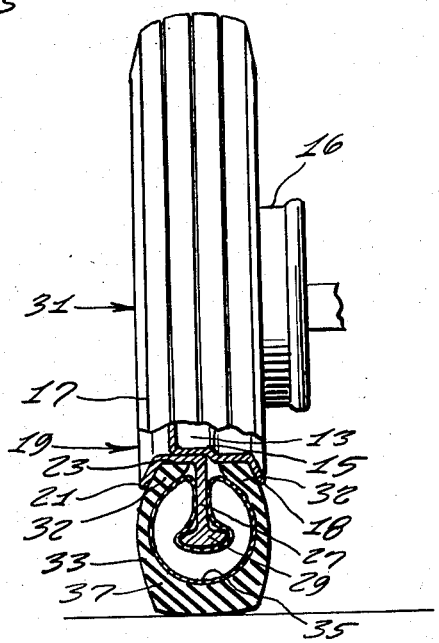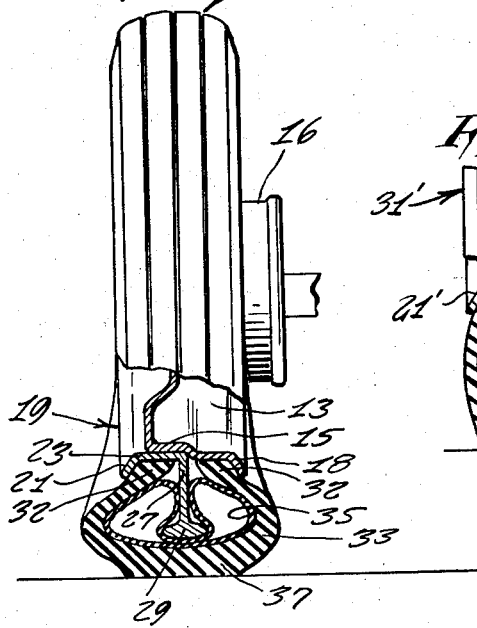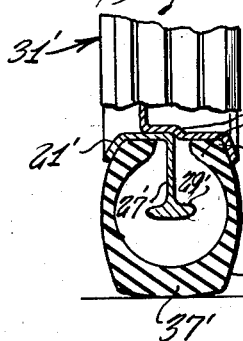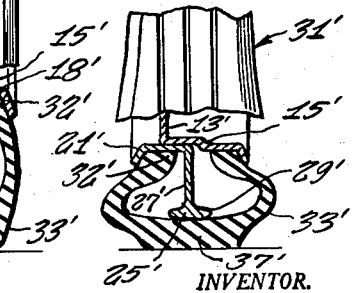
INVENTOR.
WILLIAM DE MAYO
BY Carl Miller
ATTORNEY

2,879,821

VEHICLE SAFETY WHEEL—FLAT TIRE ROLLER

William De Mayo, Forest Hill Gardens, N.Y.

Application February 23, 1956, Serial No. 567,320

1 Claim. (Cl. 152—158)

This invention relates to improvements in wheel assemblies for pneumatically tired vehicles.

Ordinarily, when a pneumatic tire of the type generally used on road vehicles is deflated because of a leak or blowout, the wheel must be changed immediately. If this is not done, the weight of the vehicle acting through the rims of the wheel can severely damage the tire and tube, or the tubeless tire, mounted on the wheel. Aside from this property damage, loss of life or physical injury can also result if the wheel must be changed on a heavily travelled street or highway, since the driver of the vehicle must expose himself to the dangers of this traffic while changing the wheel.

Accordingly, an object of this invention is to provide a safety wheel for vehicles that will overcome the aforementioned difficulties.

A further object of this invention is to provide a safety wheel for pneumatic-tired vehicles that will permit the vehicle to be driven a limited distance at a moderate speed while the tire is deflated, without damaging the tire casing.

A further object of this invention is to provide a safety wheel for pneumatic-tired vehicles that will permit the driver to be in full control of the vehicle while travelling at high speed, in the event that the tire should receive a sudden blowout, thereby enabling the driver to bring the vehicle to a stop.

A still further object of this invention is to provide a safety wheel for vehicles which will allow the weight of the vehicle to be carried by the tread portion of the tire casing while the tire is deflated.

Still further objects and advantages of this invention will be readily apparent from a study of the following description considered in conjunction with the accompanying drawing, wherein:

Figure 1 is a perspective view of a wheel made in accordance with this invention, the pneumatic tire assembly being removed;

Figure 2 is a side view of the wheel shown in Figure 1, with an inflated tire assembly applied thereto, partly in section;

Figure 3 is a view similar to Figure 2, but with the tire deflated;

Figure 4 is a side view of the wheel shown in Figure 1, with a portion of an inflated tubeless tire assembly applied thereto, partly in section; and Figure 5 is a view similar to Figure 4, but with the tubeless tire deflated.

Referring now to Figure 1 of the drawing, a safety wheel, of a type made in accordance with this invention, is shown to include an annular disk 13 having an annular flange 15 and a base portion 17 that is adapted to be secured to brake drum 16 of a vehicle axle. The flange 15 is terminated at its outer extremity by an offset annular flange or rim 18. An annular element 19 is secured, in any conventional manner, to the offset flange 15 of the wheel disk 13 and is terminated at its outer periphery by an offset annular flange or rim 21 that is laterally spaced from the corresponding rim 18 of the disk 13. The inner extremity of the annular element 19 is in the form of an annular flange 23 to which an auxiliary support assembly 25 is secured. The auxiliary support assembly is annular in configuration and T-shaped in cross section. This assembly includes a spacer web 27 which is substantially perpendicular to the flange 23, and a curved support foot 29 at the outer extremity of the spacer web 27.

As shown in Figure 2 of the drawing, a conventional tire assembly 31, which may include a casing 33 and an inner tube 35, is mounted on the wheel. The beaded edges 32 of the tire are disposed adjacent to the wheel rims 18 and 21 that hold the tire casing in place on the wheel. The spacer web 27 extends into the interior of the casing, between the beaded edges of the tire, and into engagement with the inner tube 35 that also envelopes the curved support foot 29 when the tube is inflated in the manner shown in Figure 2.

Under ordinary conditions, the wheel and tire assemblies, together with the associated support assembly 25, function in the same manner as conventional units. However, in the event that the tire is deflated for any reason, the associated support assembly 25 is effective to support the vehicle without the usual damage to the tire or tube. As shown in Figure 3, the loss of air from the inner tube causes the curved support foot 29 to be lowered into engagement with the tread portion 37 of the tire casing 33, whereby the spacer web 27 is operative to support the wheel load directly on the tire tread. This prevents the rims 18 and 21 from damaging the tire.

As shown in Figure 4 of the drawing, a conventional tubeless tire assembly 31', which includes a casing 33', is mounted on the wheel. The beaded edges 32' of the tubeless tire are disposed adjacent to the wheel rims 18' and 21' that hold the tubeless tire in place on the wheel and also provide a seal fit to retain the desired air pressure therein. The spacer web 27' extends into the interior of the tubeless casing, between the beaded edges of the tubeless tire, as more especially shown in Figure 4.

Under ordinary conditions, the wheel and tubeless tire assemblies, together with the associated support assembly 25', function in the same manner as conventional units. However, in the event that the tubeless tire is deflated for any reason, the associated support assembly 25' is effective to support the vehicle without the usual damage to the tubeless tire. As shown in Figure 5, the loss of air from the tubeless tire causes the curved support foot 29' to be lowered into engagement with the tread portion 37' of the tubeless tire casing 33', whereby the spacer web 27' is operative to support the wheel load directly on the tubeless tire tread. This prevents the rims 18' and 21' from damaging the tubeless tire.

The rigid support assembly 25 or 25' provides a constant standby substitute for the pneumatic pressure that ordinarily functions to support the vehicle. In the event that this pressure is lost, the wheel load of the vehicle continues to be transmitted to the tire tread through the spacer web 27 or 27' and support foot 29 or 29'. The support foot 29 or 29' is smoothly curved so as to avoid any edges that could otherwise damage the tube or tire, or the tubeless tire.

While a preferred form of the invention has been shown and described, it is to be understood that various changes in the construction of this device may be resorted to without departing from the spirit of this invention.

Having thus described my invention, I claim as new and desire to secure by Letters Patent:

A safety wheel assembly for wheeled vehicles, comprising, in combination, an annular disc having a central base portion for attachment to a brake drum and an offset annular tire supporting flange, an annular element secured to said flange and having an offset annular tire supporting flange, said annular element having a radially outwardly extending spacer web disposed between said supporting flanges, said spacer web extending radially outwardly beyond said flanges, and an annular foot secured to the outer periphery of said spacer web, said foot extending laterally from opposite sides of said spacer web a substantially equal distance and having rounded lateral edges of smooth continuous configuration devoid of any sharp edges or corners, and said foot being disposed substantially centrally between said tire supporting flanges and radially outwardly therefrom, said tire supporting flanges defining radially outwardly diverging surfaces in spaced relationship with said opposite lateral edges of said foot.

References Cited in the file of this patent

UNITED STATES PATENTS

| | | |
|---|---|---|
| 2,127,052 | von Bon Horst | Aug. 16, 1938 |
| 2,308,959 | Brink | Jan. 19, 1943 |
| 2,566,663 | Hollerith | Sept. 4, 1951 |
| 2,775,282 | Kennedy | Dec. 25, 1956 |